United States Patent
Spinella et al.

(10) Patent No.: US 9,568,359 B2
(45) Date of Patent: Feb. 14, 2017

(54) SEMICONDUCTOR INTEGRATED DEVICE FOR UV-INDEX DETECTION AND RELATED CALIBRATION SYSTEM AND METHOD

(71) Applicant: STIMCROELECTRONICS S.R.L., Agrate Brianza (IT)

(72) Inventors: Giuseppe Spinella, Biancavilla (IT); Marco Vito Sapienza, Catania (IT); Giuseppe Bruno, Paterno (IT)

(73) Assignee: STMICROELECTRONICS S.R.L., Agrate Brianza (IT)

( * ) Notice: Subject to any disclaimer, the term of this patent is extended or adjusted under 35 U.S.C. 154(b) by 20 days.

(21) Appl. No.: 14/669,593

(22) Filed: Mar. 26, 2015

(65) Prior Publication Data
US 2015/0346025 A1    Dec. 3, 2015

(30) Foreign Application Priority Data
May 28, 2014    (IT) .............................. TO2014A0426

(51) Int. Cl.
| | | |
|---|---|---|
| *G01J 1/42* | (2006.01) | |
| *G01J 1/44* | (2006.01) | |
| *G01J 1/02* | (2006.01) | |
| *G01J 1/08* | (2006.01) | |

(52) U.S. Cl.
CPC .............. *G01J 1/429* (2013.01); *G01J 1/0219* (2013.01); *G01J 1/44* (2013.01); *G01J 2001/083* (2013.01); *G01J 2001/4266* (2013.01); *G01J 2001/444* (2013.01)

(58) Field of Classification Search
CPC ...................................... G01J 1/42; G01J 1/44
See application file for complete search history.

(56) References Cited

U.S. PATENT DOCUMENTS

| | | | | |
|---|---|---|---|---|
| 7,148,489 | B2 * | 12/2006 | Yagi ........................ | G01J 1/429 |
| | | | | 250/372 |
| 7,227,153 | B2 * | 6/2007 | Yagi ........................ | G01J 1/429 |
| | | | | 250/372 |
| 7,467,043 | B1 * | 12/2008 | Estupinan ................. | G01J 1/02 |
| | | | | 702/3 |
| 8,829,457 | B2 * | 9/2014 | Smith ...................... | G01J 1/429 |
| | | | | 250/372 |
| 9,068,887 | B1 * | 6/2015 | Bennouri ................ | G01J 1/429 |
| 9,285,268 | B2 * | 3/2016 | Aslam ................... | G01J 1/0233 |
| 2004/0149921 | A1 * | 8/2004 | Smyk ................... | A61B 5/0059 |
| | | | | 250/372 |
| 2006/0076501 | A1 | 4/2006 | Yagi | |

(Continued)

FOREIGN PATENT DOCUMENTS

EP    2 568 266 A1    3/2013

*Primary Examiner* — Marcus Taningco
(74) *Attorney, Agent, or Firm* — Seed IP Law Group LLP (57) ABSTRACT

An integrated device for detection of the UV-index is provided with: a photodetector, which generates a detection quantity as a function of a detected UV radiation; and a processing stage, which is coupled to the photodetector and supplies at output a detected value of the UV-index, on the basis of the detection quantity. The processing stage processes the detection quantity on the basis of an adjustment factor, to supply at output the detected value of the UV-index and is further provided with an adjustment stage, coupled to the processing stage for adjusting the value of the adjustment factor.

18 Claims, 9 Drawing Sheets

(56) References Cited

U.S. PATENT DOCUMENTS

| | | | |
|---|---|---|---|
| 2006/0226371 A1* | 10/2006 | Lu | G01J 1/02 |
| | | | 250/372 |
| 2009/0224881 A1* | 9/2009 | Koon | G01W 1/02 |
| | | | 340/7.48 |
| 2012/0241633 A1 | 9/2012 | Smith et al. | |
| 2015/0041663 A1* | 2/2015 | Oliver | G01J 1/0219 |
| | | | 250/372 |
| 2015/0338273 A1* | 11/2015 | Emadi | G01J 1/429 |
| | | | 250/372 |
| 2016/0138970 A1* | 5/2016 | Lee | G01J 1/16 |
| | | | 250/372 |

\* cited by examiner

SEMICONDUCTOR INTEGRATED DEVICE FOR UV-INDEX DETECTION AND RELATED CALIBRATION SYSTEM AND METHOD

BACKGROUND

Technical Field

The present disclosure relates to a semiconductor integrated device for detection of the UV-index and to a related calibration system and method. The present description will make explicit reference, without this implying any loss of generality, to use of the device incorporated in a portable electronic apparatus, such as for example a smartphone, a tablet, a PDA (Personal Data Assistant), a digital audio player, a photographic or video camera, or the like, or else in a wearable electronic apparatus, such as for example a smart electronic bracelet or watch, or the like.

Description of the Related Art

Exposure to sources of natural light (sunlight) or artificial light involves assumption of a certain dose of ultraviolet (UV) radiation.

In a known way, ultraviolet radiation covers the portion of the electromagnetic spectrum with wavelengths between 100 nm and 400 nm and mainly divided into: UVA radiation (in the 315-400 nm range); UVB radiation (in the 280-315 nm range); and UVC radiation (in the 100-280 nm range).

In general, the degree of penetration of UV rays and thus the danger for human beings, increases as the wavelength decreases and, consequently, as the frequency increases.

The universal index of solar UV radiation, referred to more simply as UV-index (or UVI—Ultra-Violet Index), provides an indication of the level of UV radiation coming from a source. Typically, the UV-index refers to solar radiation that reaches the Earth's surface, but may likewise refer to any sources of ultraviolet radiation.

The UV-index has been conceived in the perspective of increasing the awareness of the population on the risks of an excessive exposure to UV radiation, in particular deriving from solar radiation and has been developed in the context of a co-operation between the World Health Organization, the United Nations Environment Programme (UNEP), the World Meteorological Organization and the International Commission on Non-Ionizing Radiation Protection (IC-NIRP).

It is known, in fact, that UV radiation is a common cause of numerous health problems, amongst which: burns up to skin cancer; damage to eyesight up to the risk of cataract; immunosuppression.

The values of the UV-index are usually grouped into exposure categories, associated to which is a color scale indicating danger for humans, as summed up in the table below.

| UV-index | Exposure level | Conventional color |
|---|---|---|
| <2 | Low | Green |
| 3-5 | Moderate | Yellow |
| 6-8 | High | Orange |
| 8-10 | Very High | Red |
| >11 | Extreme | Purple |

In greater detail, the UV-index has been formulated to weight the various wavelengths of the spectrum, taking into account the biological effects proper to each frequency. In particular, it is a measurement of the capacity for UV radiation to induce an erythematous reaction and is obtained by weighting each frequency of UV radiation via the so-called "erythemal-action spectrum".

The UV-index (dimensionless parameter) is given by the following expression:

$$UVI \cong k \int_{250\,nm}^{400\,nm} E_\lambda S_{er}(\lambda) d\lambda \quad [1]$$

where $E_\lambda$ is the spectral irradiance associated with UV radiation (i.e., the power of the radiation incident upon a surface per unit area), expressed in the unit of measurement W/(m$^2$·nm); k is a constant equal to 40 m$^2$/W; and $S_{er}(\lambda)$ is the aforementioned erythemal-action spectrum.

Figure 1:
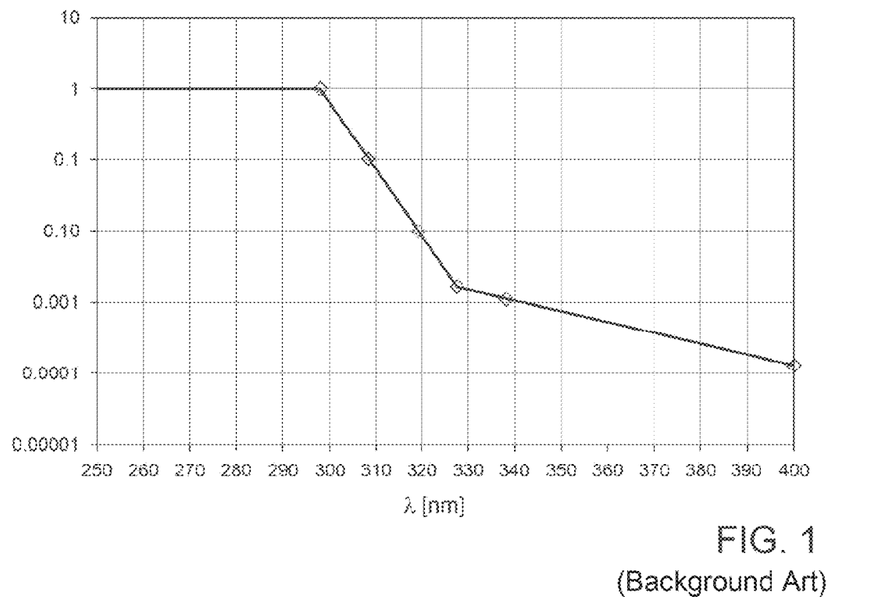
FIG. 1 is a graph regarding the plot of the erythemal-action spectrum as a function of wavelength.

In particular, the plot of the erythemal-action spectrum, as defined by CIE (Commission Internationale de l'Éclairage), using the method described by McKinlay, A. F. and Diffey, B. L., is illustrated in FIG. 1 and is given by the following expression:

$$S_{er}(\lambda) \cong \begin{cases} 1 & 250\ nm \leq \lambda \leq 298\ nm \\ 10\exp[0.094 \cdot (298-\lambda)] & 298\ nm \leq \lambda \leq 328\ nm \\ 10\exp[0.015 \cdot (139-\lambda)] & 328\ nm \leq \lambda \leq 400\ nm \\ 0 & \lambda \geq 400\ nm \end{cases}$$

In practice, the erythemal-action spectrum $S_{er}(\lambda)$ defines a weighting function for the energy associated with UV radiation, on the basis of the range of wavelengths.

Figure 2:
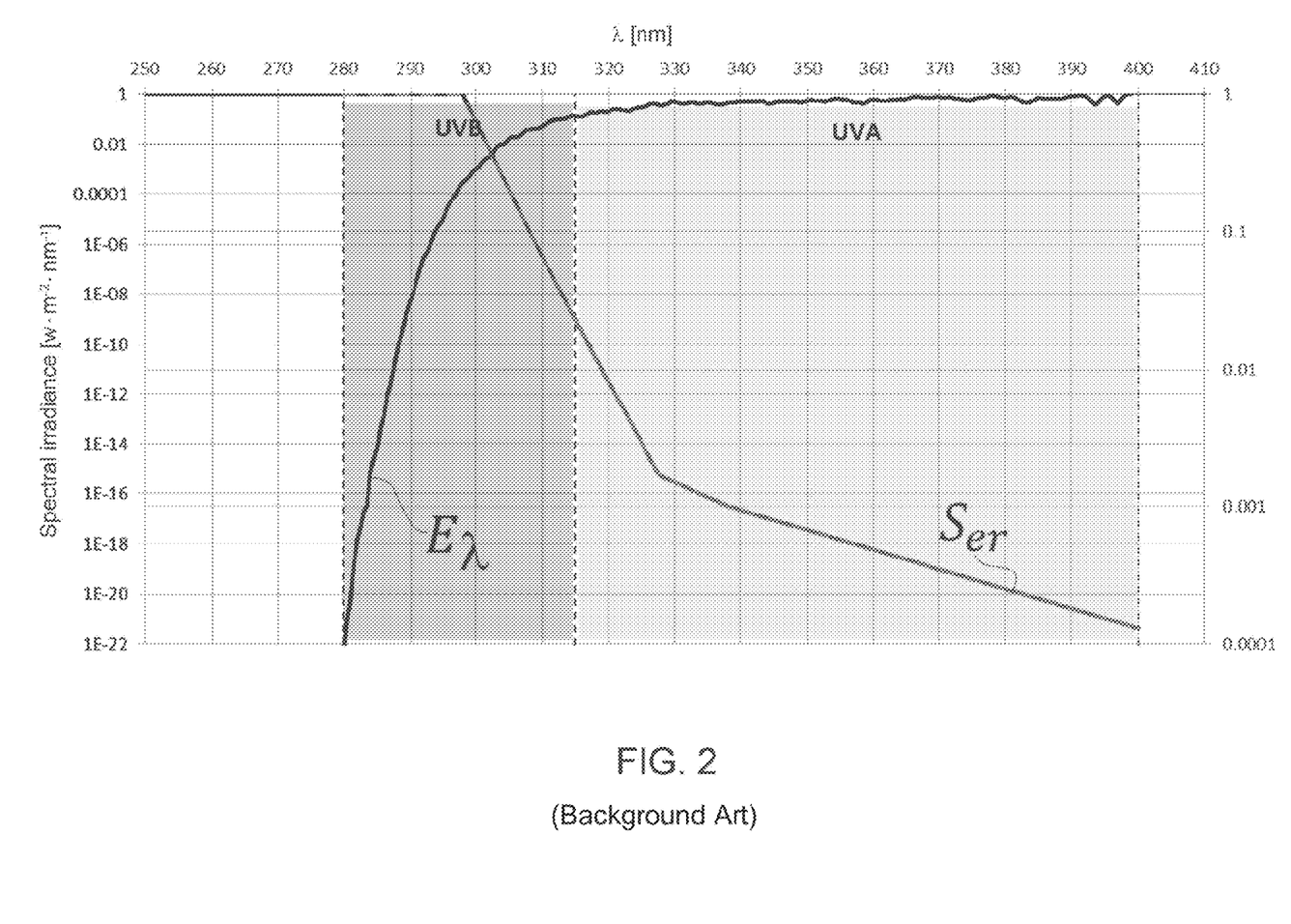
FIG. 2 is a graph regarding the spectral irradiance for solar UV radiation.

FIG. 2 shows, by way of example, the curve of the spectral irradiance $E_\lambda$ for solar radiation, measured at sea level and on a sunny day, as defined by the ASTM G173-03 standard.

Appearing once again in FIG. 2 is the plot of the erythemal-action spectrum $S_{er}(\lambda)$ and the regions associated with UVB and UVA radiation are further highlighted. As may be noted, UVC radiation associated with solar radiation is absorbed by the Earth's atmosphere.

A wide range of detection devices, which supply a measurement of the UV-index, are known today.

In particular, scientific laboratory devices, for example including spectrometers, enable an accurate measurement of UV-index to be obtained by measuring the spectral contribution of UV radiation for each wavelength and then by computing, by post-processing, the value of the UV-index applying the above Eq. [1].

Non-scientific devices also exist, which provide measurements with a greater degree of approximation and are typically based upon the use of a photodetector, in particular a photodiode operating in the ultraviolet range.

In order to improve the precision of measurement, a filtering system has to be associated with the photodetector, typically including a quartz filter and a Teflon diffuser so that the frequency response of the photodetector will approximate the weighting plot of the erythemal-action spectrum $S_{er}(\lambda)$.

Figure 3:
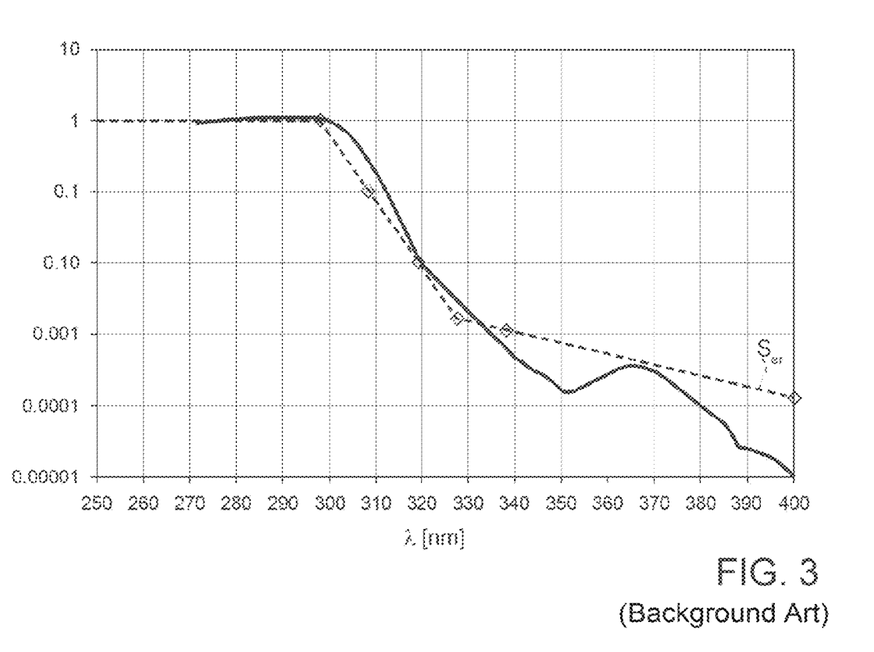
FIG. 3 is a graph regarding the response of a photodiode, appropriately filtered for approximating the erythemal-action spectrum.

By way of example, FIG. 3 shows the optical response of a UV photodiode to which a quartz filter is associated (solid line), superimposed on the plot of the erythemal-action spectrum $S_{er}(\lambda)$ (dashed line).

The above detection devices of a known type are not suited, however, to integration in portable or wearable apparatuses.

In this regard, the tendency is in fact known to incorporate new detection functions within modern portable or wearable electronic apparatuses to provide the user with an increasing amount of information.

It is likewise known that integration of detection devices in portable/wearable electronic apparatuses must meet stringent requirements in terms of costs, dimensions and levels of consumption of electrical energy.

The aforesaid detection devices do not meet these requirements, given that they are typically too costly and complex to produce. Further, they may have dimensions that are not compatible with integration in portable or wearable electronic apparatuses.

BRIEF SUMMARY

One aim of the present disclosure is to provide a solution for UV-index detection having characteristics such as to enable, where required, integration thereof within portable or wearable electronic apparatuses.

According to the present disclosure, a detection device and a related calibration system and method are consequently provided as defined in the annexed claims.

BRIEF DESCRIPTION OF THE SEVERAL VIEWS OF THE DRAWINGS

For a better understanding of the present disclosure, preferred embodiments thereof are now described, purely by way of non-limiting example and with reference to the attached drawings, wherein.

DETAILED DESCRIPTION

The present solution stems from the realization, by the present Applicant, that, assuming as constant the pattern of the radiation emitted by the source of UV radiation as a function of the wavelength, in particular as regards the corresponding spectral irradiance, and assuming the use of a photodetector for the detection of UV radiation, then it is possible to correlate, via a factor of linear proportionality, the response of the photodetector to the UV-index, as the intensity of the emitted radiation varies.

Figure 4:
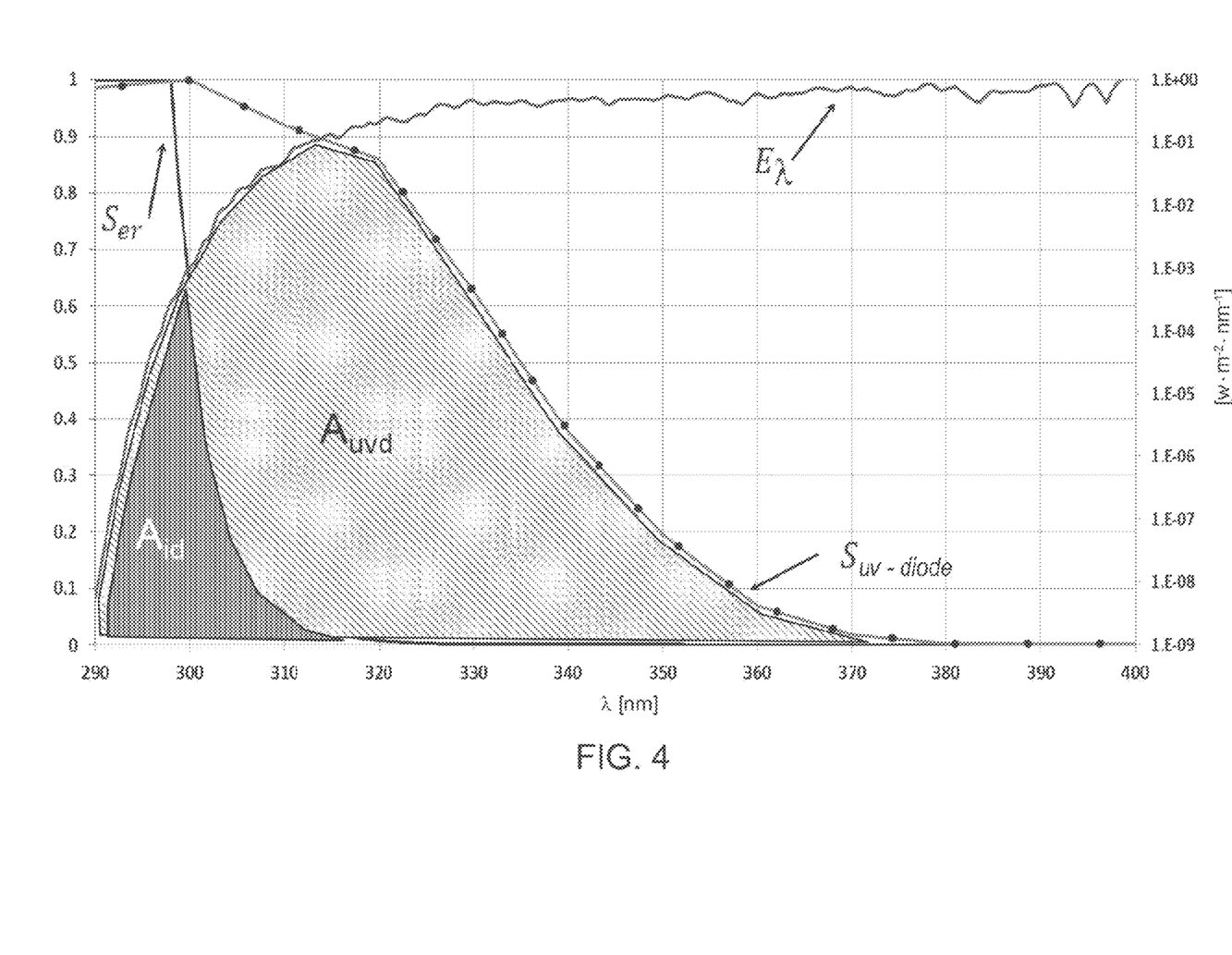
FIG. 4 shows the plots of the response of a photodetector, of the erythemal-action spectrum and of the spectral irradiance, where areas subtended by the curves are highlighted.

To clarify what has been set forth above, reference may be made to FIG. 4, which illustrates: the plot, as a function of the wavelength, of the response of the photodetector, in particular a UV photodiode, designated by $S_{uv\_diode}$; the plot, already illustrated previously, of the erythemal-action spectrum $S_{er}(\lambda)$; and the plot of the spectral irradiance $E_\lambda$ associated with the UV radiation.

In the same FIG. 4, there are further indicated the area $A_{id}$, which is the result of the integral of the product $E_\lambda S_{er}(\lambda)$ and the area $A_{uvd}$, which is the result of the integral of the product $E_\lambda S_{uv\_diode}$.

As will emerge clearly, the area $A_{uvd}$ indicates the current $I_{puvd}$ effectively generated by the photodetector upon detection of UV radiation, as a function of its frequency response, whereas the area $A_{id}$ indicates a current $I_{pid}$ that would be ideally detected by a photodiode that had a frequency response corresponding to the plot of the erythemal-action spectrum $S_{er}(\lambda)$ and thus indicates the value of the UV-index, according to above Eq. [1].

It is consequently possible to identify a correlation factor $G_{trim}$, which links the aforesaid areas and thus the aforesaid currents, according to the following relation of linear proportionality:

$$I_{puvd} = G_{trim} \cdot I_{pid}$$

In particular, given the invariance of the pattern with respect to the wavelength of the UV radiation emitted by the source, in particular as regards the corresponding spectral irradiance, the aforesaid linear correlation is found to be valid as the intensity of the UV radiation emitted varies.

Figure 5:
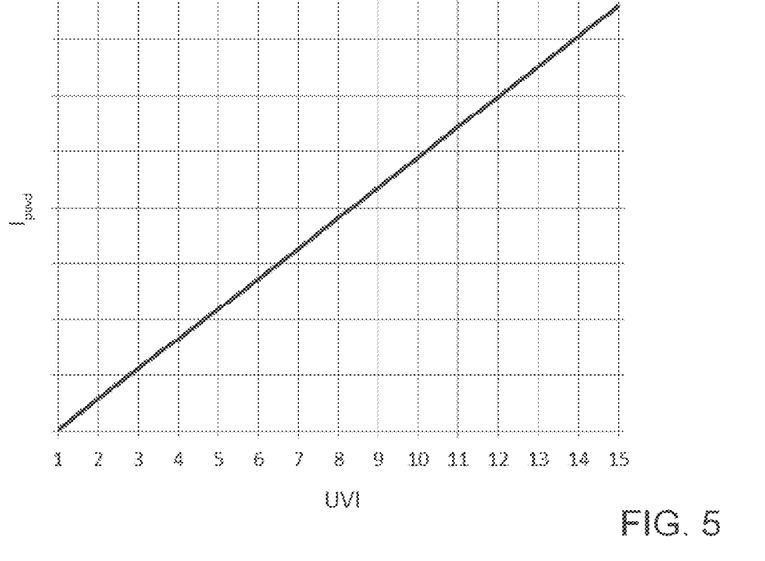
FIG. 5 is a graph representing the linear correlation existing between the UV-index and the current detected by the photodetector.

Consequently, the UV-index and the current $I_{puvd}$ effectively detected by the photodetector are linked by a linear relation, as illustrated in FIG. 5, that is a function of the correlation factor $G_{trim}$.

The present Applicant has further verified, by analyses and tests using laboratory spectrometers, the fact that solar radiation has effectively in the UV band a pattern that may be assumed as being substantially constant and uniform with respect to the variations of place on the Earth's surface (variations of latitude) in which the measurement is made and further with respect to the variations in time.

In particular, the diagram of spectral irradiance as a function of the wavelength is substantially constant, practically unvaried in shape (only the corresponding intensity, or amplitude, varying), as the latitude or the time of measurement varies.

Figure 6:
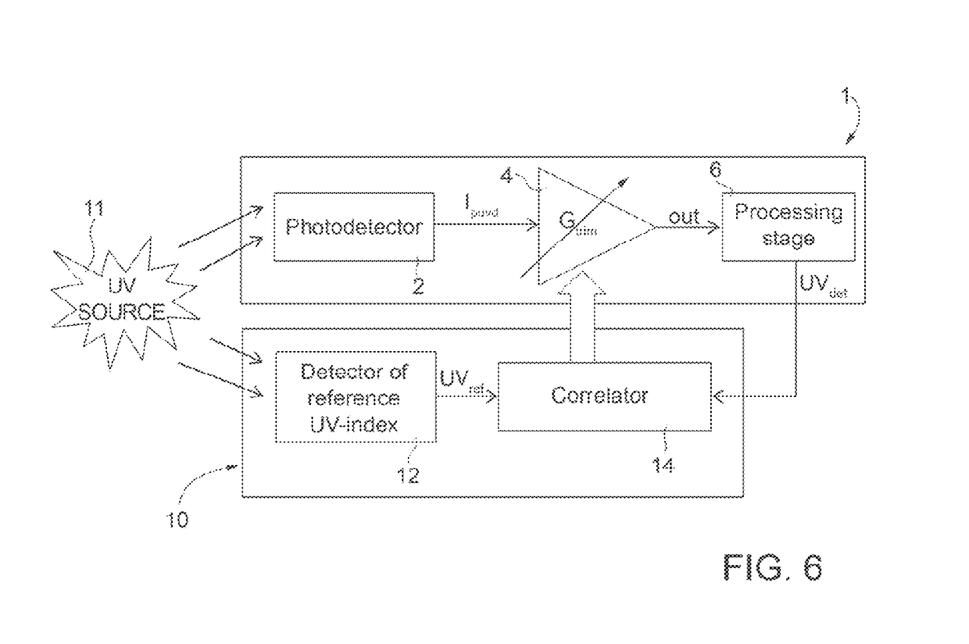
FIG. 6 is a general block diagram of a UV-index detection device and of a related calibration system.

An aspect of the present disclosure thus envisages, as illustrated schematically in FIG. 6, a UV-index detection device, designated as a whole by 1, which comprises: a photodetector stage 2, for example including a photodiode of the silicon carbide (SiC) type, which supplies at output a detection quantity, in particular a current $I_{puvd}$, as a function of the radiation detected; an adjustment stage 4, coupled to the output of the photodetector stage 2 and configured to apply a correlation factor $G_{trim}$, of a variable value, to the current $I_{puvd}$, for generating an adjusted detection quantity Out; and a processing stage 6, coupled to the output of the adjustment stage 4 and configured to process the adjusted detection quantity Out and supplying at output the detected value $UV_{det}$ of the UV-index.

On the basis of the foregoing discussion, once the correct value has been identified for the correlation factor $G_{trim}$, the detection device 1 is able to provide an accurate estimate of the value of the UV-index, for a given source (the radiation of which has a substantially constant pattern as a function of the wavelength), for any intensity of the UV radiation emitted, exploiting for the purpose the linear correlation between the current $I_{puvd}$ and the UV-index itself.

In order to identify the value of the correlation factor $G_{trim}$, the present solution envisages a calibration system 10, which is coupled to the detection device 1 in the production stage, i.e., at the end of its manufacture.

The aforesaid calibration system 10 includes:

- a reference UV source 11 (the radiation of which has a diagram of spectral irradiance as a function of the wavelength that is practically invariant in shape, and further substantially corresponds to the plot of the radiation emitted by the source the radiation of which is to be detected in use by the detection device 1);
- a reference UV-index detection device 12, configured to provide a reference value $UV_{ref}$ of the UV-index of the radiation emitted by the reference UV source 11; the device may, for example, be a known laboratory instrument, including a spectrometer, or else a photodiode with an appropriate filtering system associated thereto, such as to cause the frequency response to correspond to the erythemal-action spectrum $S_{er}(\lambda)$; and
- a correlator device 14, including a microprocessor, a microcontroller, an FPGA, or a similar processing unit, coupled to the reference UV-index detection device 12, for receiving the reference value $UV_{ref}$ of the UV-index and further to the processing stage 6 of the detection device 1, for receiving the detected value $UV_{det}$ of the UV-index.

The correlator device 14 is further operatively coupled to the adjustment stage 4 of the detection device 1 and is configured to compare the reference value $UV_{ref}$ and the detected value $UV_{det}$ of the UV-index and for varying the value of the correlation factor $G_{trim}$ in order to cause these values to correspond (thus obtaining a so-called "matching").

For instance, the correlator device 14 may be configured to vary in an incremental manner (or, likewise, in a decremental manner), iteratively in successive steps, the value of the correlation factor $G_{trim}$, each time comparing the reference value $UV_{ref}$ and the detected value $UV_{det}$ of the UV-index and stopping the calibration operations when these values are equal, or do not differ by more than a given comparison threshold.

Figure 7:
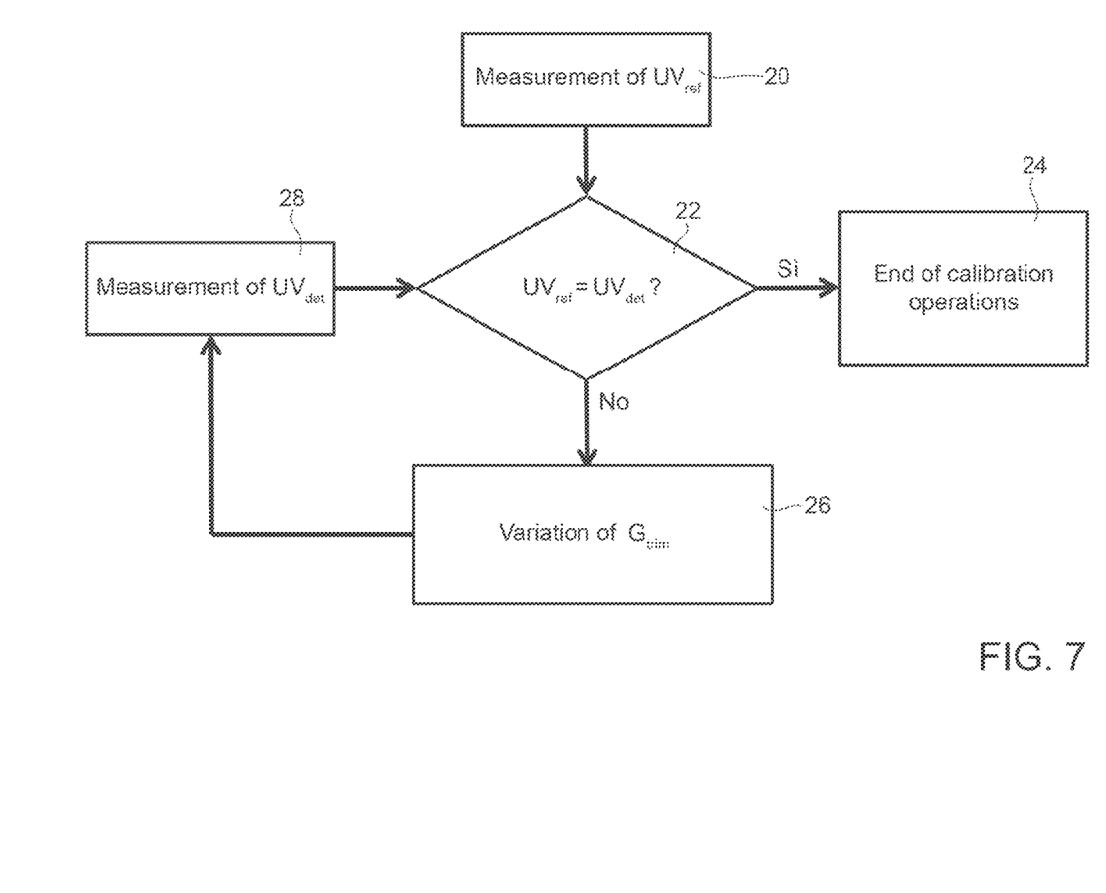
FIG. 7 is a flowchart of operations performed by the calibration system of FIG. 6.

In detail and with reference to the flowchart of FIG. 7, the calibration algorithm implemented by the calibration system 10 envisages (step 20) generation, by the reference UV-index detection device 12, of the reference value $UV_{ref}$ of the UV-index, on the basis of the detection of the radiation generated by the reference UV source 11.

Then (step 22), a comparison is made, by the correlator device 14, between the reference value $UV_{ref}$ and the detected value $UV_{det}$ of the UV-index supplied by the detection device 1.

In the case where this comparison determines that the aforesaid values are equal (or do not differ by more than a given comparison threshold), the calibration algorithm terminates (step 24) in so far as this means that the detection device 1 is calibrated.

Otherwise (step 26), the correlator device 14 acts on the adjustment stage 4 of the detection device 1 by varying a current value of the correlation factor $G_{trim}$, for example in an incremental manner (or, likewise, in a decremental manner) with respect to a previous value.

Next (step 28), the detection device 1 generates a new detected value $UV_{det}$ of the UV-index, which is supplied to the correlator device 14, for a new comparison with the reference value $UV_{ref}$.

The algorithm thus returns iteratively to step 22, for performing the new comparison and the operations proceed as discussed previously up to the end of the calibration procedure.

In particular, advantageously, once calibration has been carried out via the correlation factor $G_{trim}$, the detection device 1 will be able to correctly detect the value of the UV-index for any intensity of UV radiation emitted by the ultraviolet radiation sources (for which it has been calibrated).

Figure 8:
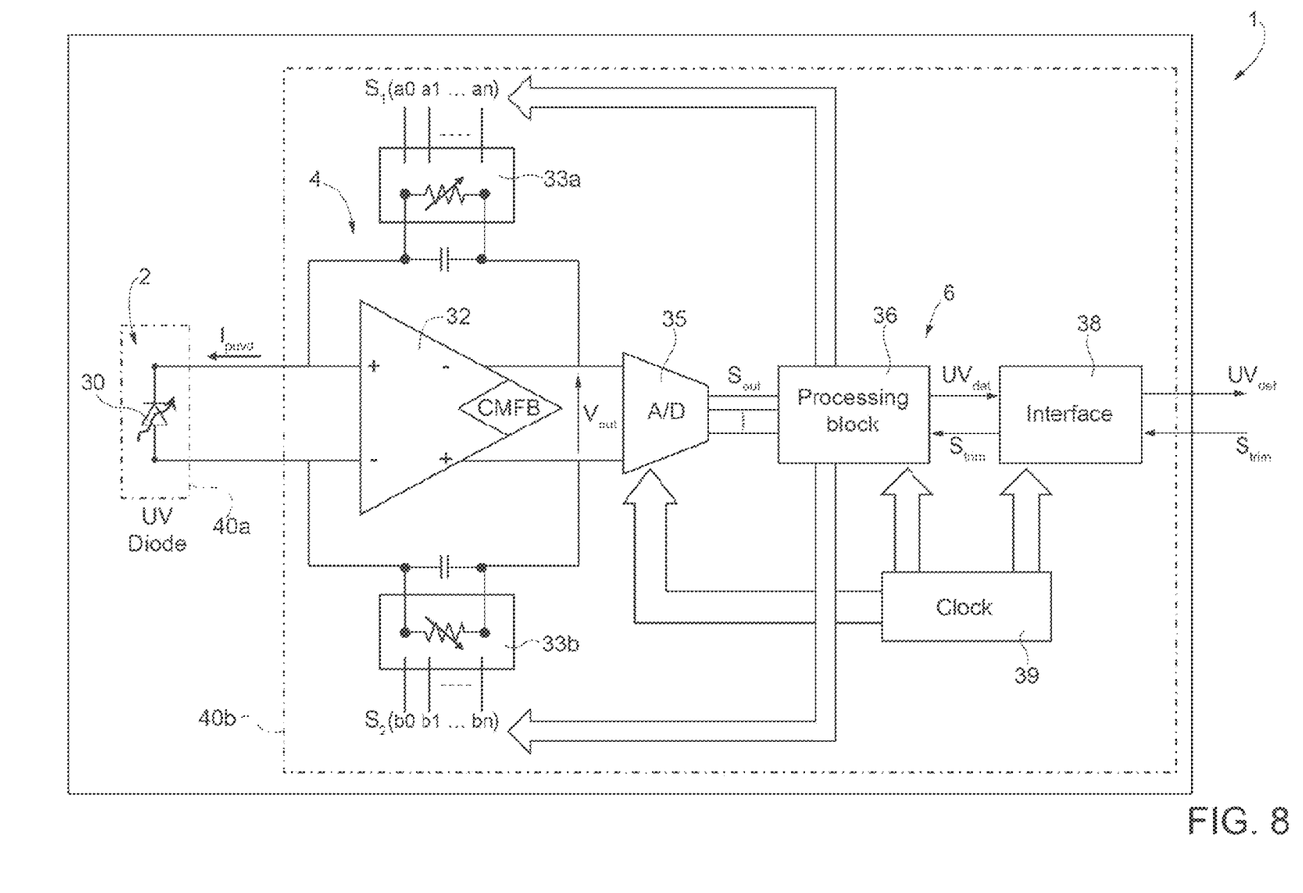
FIG. 8 is a circuit block diagram of the detection device of FIG. 6.

With reference to FIG. 8, a possible embodiment of the detection device 1 is now described in greater detail.

The photodetector stage 2 in this case includes a UV photodiode 30, in particular of the silicon carbide (SiC) type, which supplies the detection current $I_{puvd}$ in response to the detected radiation.

The processing stage 6 comprises a variable-gain transimpedance amplifier (TIA) 32, in particular of a fully differential type with common-mode feedback (CMFB).

The adjustment stage 4 comprises: a first variable-resistance adjustment resistor 33a, connected between a first differential input and a first differential output of the transimpedance amplifier 32; and a second variable-resistance adjustment resistor 33b, connected between a second differential input and a second differential output of the transimpedance amplifier 32.

The first adjustment resistor 33a is configured to receive a first adjustment digital signal S1 (a0, a1, . . . , an), on the basis of which to vary its own resistance; likewise, the second adjustment resistor 33b is configured to receive a second adjustment digital signal S2 (b0, b1, . . . , bn), on the basis of which to vary its own resistance.

The transimpedance amplifier 32 generates at output an output-voltage signal $V_{out}$ as a function of the value of the detection current $I_{puvd}$ generated by the UV photodiode 30 and further of the variable gain defined by the first and second adjustment resistors 33a, 33b; in particular, this variable gain here corresponds to the correlation factor $G_{trim}$ defined previously.

The processing stage 6 further comprises, in this embodiment: an analog-to-digital converter 35, connected to the output of the transimpedance amplifier 32 and configured to convert the output-voltage signal Vout into a digital signal $S_{out}$; and a processing block 36, which receives the digital signal $S_{out}$ and processes it for generating the detected value $UV_{det}$ of the UV-index (in particular on the basis of the aforementioned Eq. [1]).

The processing stage 6 further comprises an interface 38, coupled to the processing block 36 and configured to transmit to the outside, for example to an external control unit of an electronic apparatus incorporating the detection device 1, the detected value $UV_{det}$ of the UV-index.

According to an aspect of the present solution, the interface 38 is further configured to communicate with the calibration system 10 and in particular for receiving at input a calibration signal $S_{trim}$ from the correlator device 14, during the step of calibration of the detection device 1.

The processing block 36 receives from the interface 38 the calibration signal $S_{trim}$ and, as a function of its value, generates the first and second adjustment digital signals S1, S2 for varying the value of the first and second adjustment resistors 33a, 33b and, consequently, the variable gain of the transimpedance amplifier 32, for thereby varying the correlation factor $G_{trim}$.

The detection device 1 further comprises a timing block 39, configured to generate a common clock signal for the analog-to-digital converter 35, the processing block 36 and the interface 38 (in a per se known manner, not described in detail herein).

As illustrated schematically in the same FIG. 8, the integrated implementation of the detection device 1 may envisage that: the photodetector stage 2 is provided in a first die 40a including semiconductor material, in particular silicon; and the adjustment and output stages 4, 6 are provided in an ASIC (Application-Specific Integrated Circuit), integrated in a second die 40b including semiconductor material, in particular silicon.

Figure 9A:
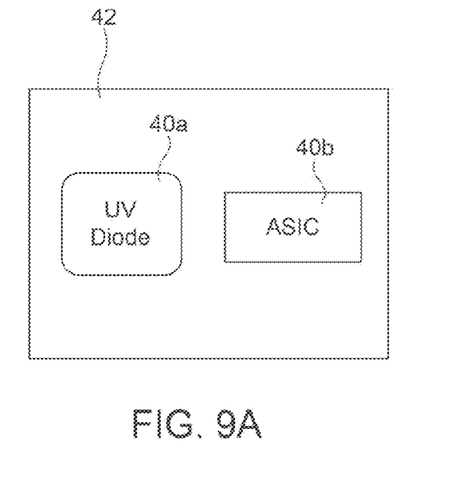
FIGS. 9a and 9b are schematic illustrations of respective configurations of a package of the detection device.

As schematically illustrated in FIG. 9a, the arrangement of the first and second dice 40a, 40b within a corresponding package 42 may be of the so-called "side-by-side" type, with the two dice arranged side-by-side on a substrate (not illustrated), coated with an appropriate coating, the so-called "mold" (not illustrated either).

Figure 9B:
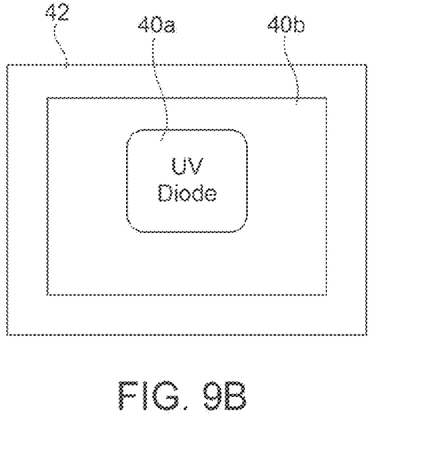

Alternatively, as illustrated schematically in FIG. 9b, the first and second dice 40a, 40b may be stacked on top of one another within the package 42; for example, the first die 40a may be arranged on the second die 40b.

Figure 10:
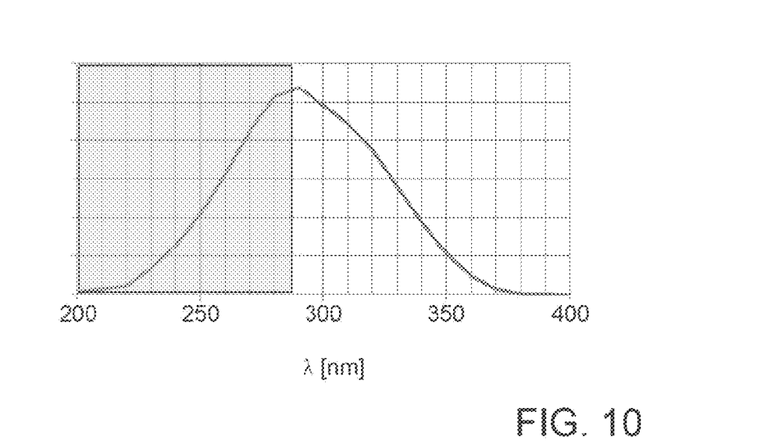
FIG. 10 is a graph of the response of a photodiode of the detection device.
Figure 11:
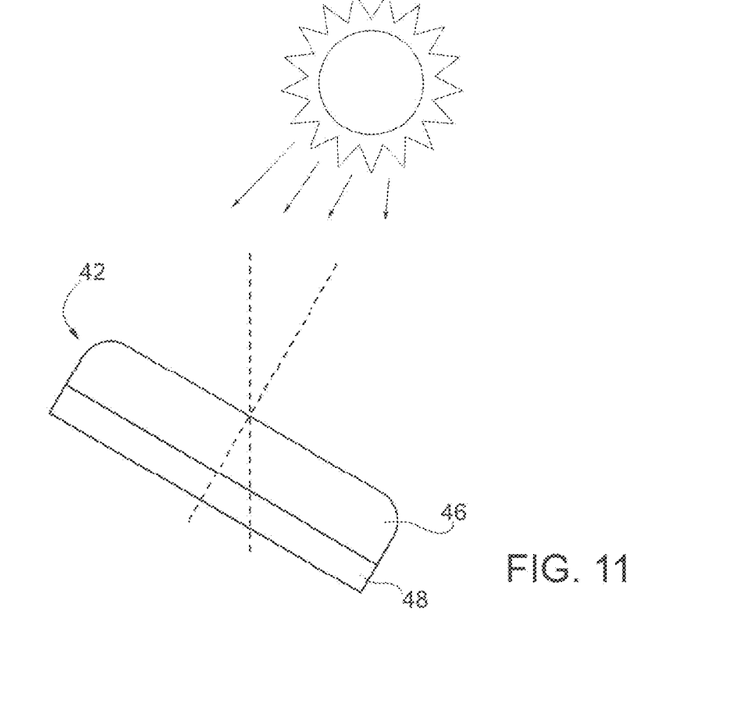
FIG. 11 is a schematic illustration of a package of the detection device, impinged upon by solar rays.

In any case, further aspects of the present solution envisage certain arrangements for manufacture of the detection device 1 and of the corresponding package 42 and in particular envisage: providing, as illustrated schematically in FIG. 10, the UV photodiode 30 in such a way that it is "blind" (i.e., with a zero response) in regard to visible radiation and so that it has a peak in its response for a wavelength approximately equal to 290 nm; providing, as illustrated schematically in FIG. 11, the package 42, in such a way that the mold, here designated by 46, which coats the dice (here not illustrated) and the substrate, here designated by 48, in addition to protecting the dice, ensures that a desired field of view (FOV) is achieved for the photodetector.

Figure 12:
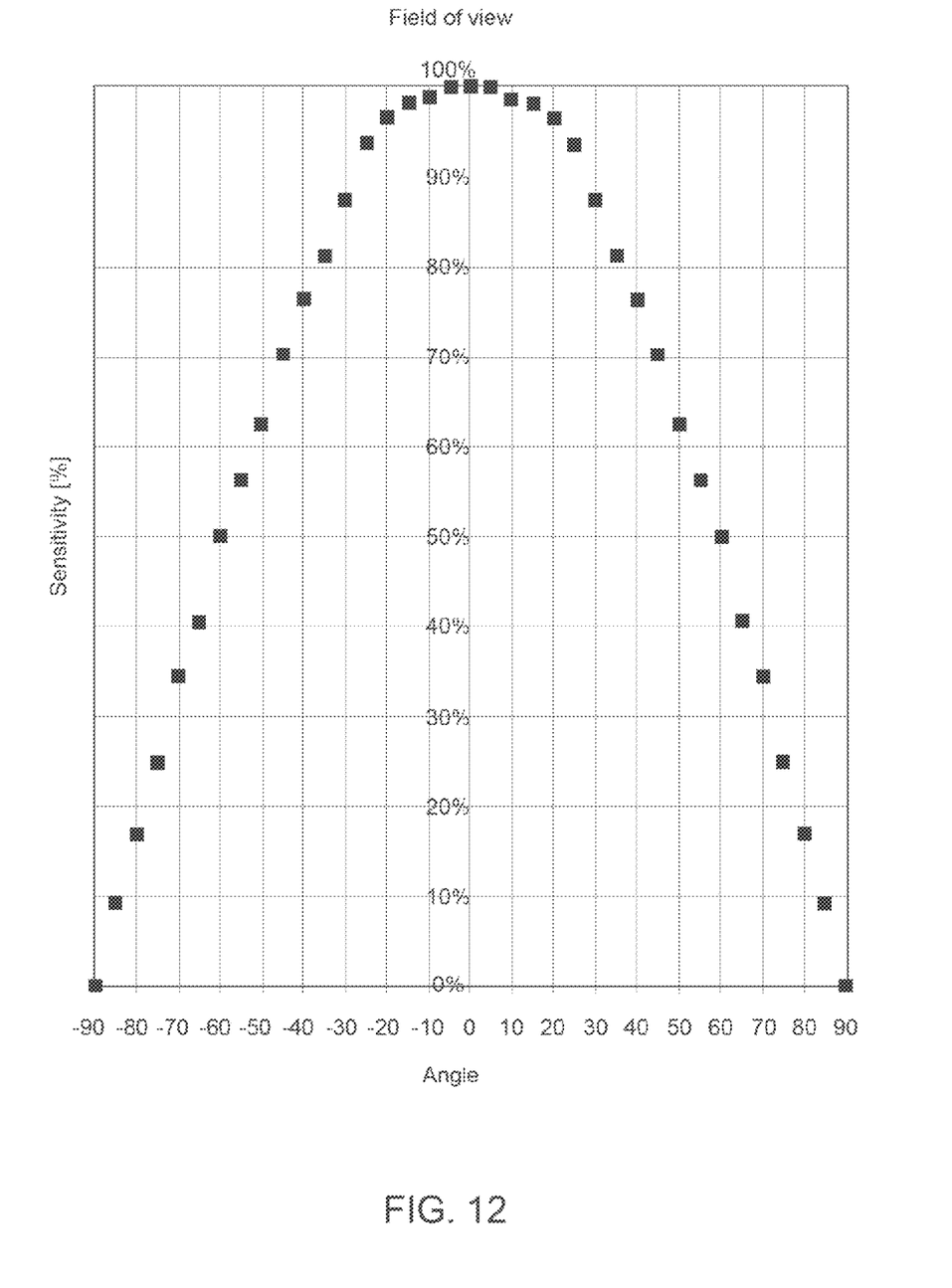
FIG. 12 is a graph regarding the field of view of the photodiode of the detection device.

In particular, as illustrated in FIG. 12, field of view may advantageously envisage a substantially cosinusoidal plot as a function of the variation of the angle of incidence of the rays coming from the source of UV radiation (for example sunlight) on the detection surface.

From what has been described so far, the advantages that the present solution affords will emerge clearly.

In any case, it is once again emphasized that this solution provides an effective and low-cost estimate of the UV-index, not envisaging the use of filtering elements or further costly (and cumbersome) optical elements.

In particular, the detection device 1 has compact dimensions and the method for its production is simple and inexpensive.

The solution described is thus particularly advantageous in a wide range of fields of application and in particular for use in a portable and/or wearable electronic apparatus.

Figure 13:
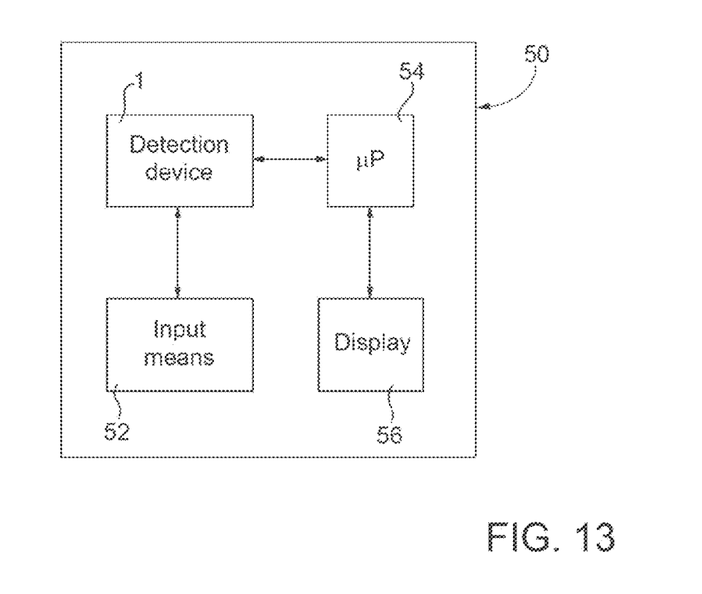
FIG. 13 shows a general block diagram of a portable/wearable electronic apparatus incorporating the detection device.

For instance, FIG. 13 is a schematic illustration of an electronic apparatus 50, of a portable/wearable type, which incorporates the detection device 1.

The electronic apparatus 50 comprises input means 52, including keys or similar actuation elements, which are operated by a user, for example for carrying out desired actions within a user interface (UI—User Interface).

The electronic apparatus 50 further comprises: a control unit 54, for example, a microprocessor (μP) control unit, designed to manage general operation thereof; and a display element 56, appropriately controlled by the control unit 54, for example for displaying the aforesaid user interface.

The detection device 1 is set in such a way as to detect the UV radiation in the environment of the electronic apparatus 50 and is coupled to the control unit 54 to supply the detected value $UV_{det}$ of the UV-index.

The control unit 54 may be configured to display this value on the display element 56 so that it may be read by the user.

Finally, it is clear that modifications and variations may be made to what has been described and illustrated herein, without thereby departing from the scope of the present disclosure.

In particular, it is once again emphasized how the detection device 1 may find advantageous application also in non-portable and/or non-wearable apparatuses, for example in fixed environment-detection stations.

Furthermore, it is evident that the aforesaid detection device 1 may possibly use a different type of photodetector for detection of UV radiation and/or a different circuit configuration for generation of the detected value $UV_{det}$ of the UV-index.

The various embodiments described above can be combined to provide further embodiments. These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. An integrated device for detection of the UV-index of ultraviolet (UV) radiation, comprising:
   a single photodetector configured to generate an electrical detection quantity as a function of detected UV radiation;
   a processing stage coupled to the single photodetector and configured to process said electrical detection quantity on the basis of an adjustment factor and to supply at an output a detected value of the UV-index for the detected UV radiation; and
   an adjustment stage coupled to said processing stage and configured to adjust the value of said adjustment factor.

2. The integrated device according to claim 1, wherein said adjustment stage is configured to adjust the adjustment factor so that said adjustment factor defines a relation between said electrical detection quantity and the UV-index.

3. The integrated device according to claim 2, wherein the value of said adjustment factor is such that the following linear relation applies:

$$I_{puvd} = G_{trim} \cdot I_{pid}$$

where ($G_{trim}$) is the adjustment factor, $I_{puvd}$ is an electric current that corresponds to said electrical detection quantity and $I_{pid}$ is an electric current that would be detected by said single photodetector in the case where it had a response, as a function of the wavelength, substantially coinciding with the erythemal-action spectrum $S_{er}(\lambda)$.

4. The integrated device according to claim 1, wherein said adjustment stage has an input that is designed to receive from outside said integrated device an adjustment signal and is configured to adjust the adjustment factor as a function of said adjustment signal.

5. The integrated device according to claim 1, wherein said adjustment stage is configured to operate in a calibration mode responsive to a first adjustment signal to adjust the value of said adjustment factor.

6. The integrated device according to claim 1, wherein said single photodetector comprises a semiconductor photodiode.

7. The integrated device according to claim 1, wherein said processing stage comprises: an amplifier with a variable gain, which is a function of said adjustment factor configured to receive said electrical detection quantity and to supply an output signal as a function of the product of said detection quantity and said adjustment factor; and an output block configured to generate said detected value of the UV-index on the basis of said output signal.

8. The integrated device according to claim 1, wherein the UV radiation is generated by a radiation source the spectral irradiance of which has a pattern as the wavelength varies that is substantially invariant in shape.

9. The integrated device according to claim 1, comprising a first die of semiconductor material in which said single photodetector is formed; a second die of semiconductor material in which an ASIC is formed, the ASIC integrating said adjustment stage and said processing stage; and a package housing said first die and second die.

10. A calibration system of an integrated device, said calibration system comprising:
a UV-index detection device including,
a photodetector configured to generate an electrical detection quantity as a function of detected UV radiation;
a processing stage coupled to the photodetector and configured to process said electrical detection quantity on the basis of an adjustment factor and to supply at an output a detected value of the UV-index for the detected UV radiation;
an adjustment stage coupled to said processing stage and configured to adjust the value of said adjustment factor; and
a calibration subsystem including,
a reference UV-index detection device, configured to provide a reference value of the UV-index as a function of detection of a reference UV radiation; and
a correlator device, coupled to the reference UV-index detection device for receiving the reference value of the UV-index, and to the processing stage of the integrated device for receiving the detected value of the UV-index as a function of detection by said detection device of said reference UV radiation, wherein said correlator device is further coupled to the adjustment stage of the integrated device to vary the value of said adjustment factor until the detected value of the UV-index corresponds to the reference value, thus carrying out a calibration of said adjustment factor.

11. The calibration system according to claim 10, further comprising a radiation source operating as a reference and configured to generate said reference UV radiation, the spectral irradiance of which has a pattern as the wavelength varies that is substantially invariant in shape.

12. A method for calibrating an integrated device, said method comprising:
detecting a reference UV radiation;
generating a reference value of the UV-index as a function of the detected reference UV radiation;
detecting with a single UV photo detector a value of the UV-index based upon detection of the reference UV radiation;
comparing the reference value of the UV-index with the detected value of the UV-index;
varying the value of an adjustment factor based on the comparing the reference value of the UV-index with the detected value of the UV-index until the detected value of the UV-index corresponds to the reference value of the UV-index; and
setting the value of the adjustment factor to the value where the detected value of the UV index corresponds to the reference value of the UV-index to thereby calibrate the integrated device.

13. The method according to claim 12, further comprising generating said reference radiation, the spectral irradiance of which has a pattern, as the wavelength varies, that is substantially invariant in shape.

14. An electronic device, comprising:
input circuitry;
display circuitry;
detection circuitry configured to detect the UV-index of ultraviolet (UV) radiation in the environment of the electronic device, the detection circuitry including,
a single photodetector configured to generate an electrical detection quantity as a function of detected UV radiation;
a processing stage coupled to the single photodetector and configured to process said electrical detection quantity on the basis of an adjustment factor and to supply at an output a detected value of the UV-index for the detected UV radiation; and
an adjustment stage coupled to said processing stage and configured to adjust the value of said adjustment factor; and
a control unit coupled to the input circuitry, display circuitry, and detection circuitry and configured to control the display circuitry to display a value of the detected value of the UV-index for the detected UV radiation.

15. The electronic device of claim 14 wherein the electronic device comprises a wearable electronic device.

16. The electronic device of claim 15 wherein the wearable electronic device comprises a smart electronic bracelet or a watch.

17. The electronic device of claim 14 wherein the electronic device comprises one of a smartphone, a tablet computer, a personal digital assistant, a digital audio player, a camera, and a video recorder.

18. The electronic device of claim 14 wherein the single photodetector comprises a single photodiode.

* * * * *

UNITED STATES PATENT AND TRADEMARK OFFICE
CERTIFICATE OF CORRECTION

PATENT NO. : 9,568,359 B2  
APPLICATION NO. : 14/669593  
DATED : February 14, 2017  
INVENTOR(S) : Giuseppe Spinella et al.

Page 1 of 1

It is certified that error appears in the above-identified patent and that said Letters Patent is hereby corrected as shown below:

On the Title Page

Item (71)
Reads:
"STIMCROELECTRONICS S.R.L., Agrate Brianza (IT)"

Should read:
-- STMICROELECTONICS S.R.L., Agrate Brianza (IT) --.

Signed and Sealed this
Thirtieth Day of May, 2017

Michelle K. Lee
*Director of the United States Patent and Trademark Office*